United States Patent
Sullivan

(10) Patent No.: US 7,761,183 B2
(45) Date of Patent: Jul. 20, 2010

(54) METHODS AND SYSTEMS FOR PRODUCING NUMERICAL CONTROL PROGRAM FILES FOR CONTROLLING MACHINE TOOLS

(76) Inventor: Douglas G. Sullivan, 6815 Cloud Crest Dr., Amarillo, TX (US) 79124-1429

( * ) Notice: Subject to any disclaimer, the term of this patent is extended or adjusted under 35 U.S.C. 154(b) by 1102 days.

(21) Appl. No.: 11/352,649

(22) Filed: Feb. 13, 2006

(65) Prior Publication Data
US 2007/0191982 A1 Aug. 16, 2007

(51) Int. Cl.
G06F 19/00 (2006.01)
(52) U.S. Cl. .................................. 700/182; 700/18
(58) Field of Classification Search .............. 700/18, 700/86, 87, 180–187
See application file for complete search history.

(56) References Cited

U.S. PATENT DOCUMENTS

| | | | |
|---|---|---|---|
| 4,370,720 A | 1/1983 | Hyatt | |
| 4,912,625 A | 3/1990 | Glatfelter | |
| 4,928,221 A | 5/1990 | Belkhiter | |
| 4,949,270 A | 8/1990 | Shima et al. | |
| 5,029,329 A * | 7/1991 | Miyajima | 700/159 |
| 5,270,918 A | 12/1993 | Seki et al. | |
| 5,293,321 A | 3/1994 | Fujita et al. | |
| 5,297,022 A | 3/1994 | Watanabe | |
| 5,532,933 A | 7/1996 | Nakata | |
| 5,584,016 A | 12/1996 | Varghese et al. | |
| 5,963,451 A | 10/1999 | Seki et al. | |
| 6,112,133 A | 8/2000 | Fishman | |
| 6,311,100 B1 | 10/2001 | Sarrna et al. | |
| 6,643,560 B2 | 11/2003 | Shimomura | |
| 6,671,571 B1 | 12/2003 | Matsumiya et al. | |
| 6,704,611 B2 | 3/2004 | Coleman et al. | |
| 6,741,905 B1 | 5/2004 | Fishman et al. | |
| 6,745,100 B1 | 6/2004 | Lermuzeaux | |
| 6,795,749 B2 * | 9/2004 | Suh et al. | 700/181 |
| 6,804,575 B2 | 10/2004 | Sagawa et al. | |
| 6,868,359 B2 | 3/2005 | Raab | |
| 6,885,984 B1 | 4/2005 | Suzuki et al. | |
| 6,889,114 B2 | 5/2005 | Nakamura | |
| 6,904,394 B2 | 6/2005 | Jaffrey | |
| 6,907,312 B2 | 6/2005 | Sagawa et al. | |
| 6,907,313 B2 | 6/2005 | Matthews et al. | |
| 6,957,123 B2 | 10/2005 | Nakamura | |
| 2002/0091460 A1 * | 7/2002 | Allen | 700/173 |
| 2005/0038552 A1 * | 2/2005 | Sagawa et al. | 700/181 |

\* cited by examiner

*Primary Examiner*—Paul L Rodriguez
*Assistant Examiner*—Nathan Laughlin
(74) *Attorney, Agent, or Firm*—Fennemore Craig, P.C.

(57) ABSTRACT

A manual computer numerical control (CNC) programming method and system (which may be embodied in whole or part in an article of manufacture or apparatus) in which coordinates may be manually entered into a text editor into a file format known as the coordinate work sheet (CWS) including verification, modification and conversion of the CWS to G-Code, the coordinate work sheet format being a comma delimited ASCII text file, and further including cutter on/off commands and using computer aided design (CAD) data to generate the coordinate work sheet (CWS).

6 Claims, 13 Drawing Sheets

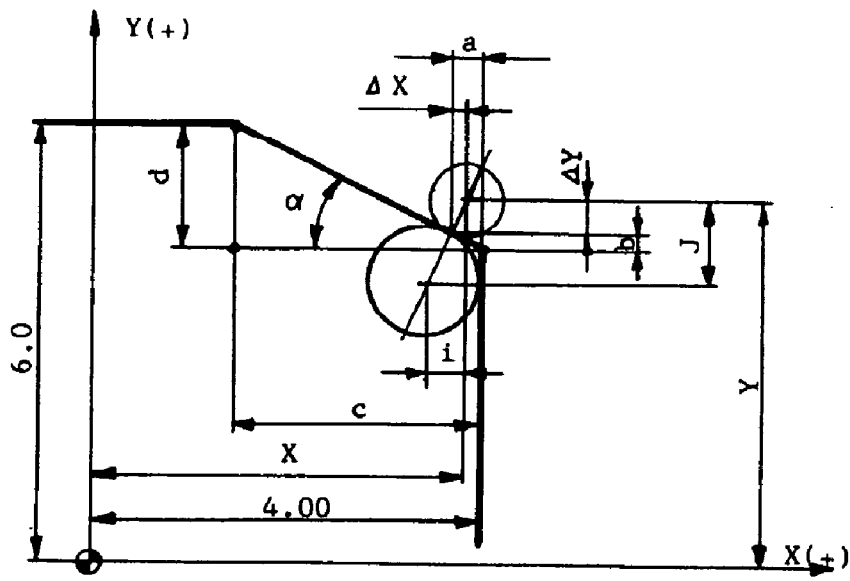

N14   X38891   Y57680

$$X = 4.0 - a + \Delta X$$

$$R = .375 \quad \alpha = 25°$$

$$a = R \times \tan\left(45° - \frac{\alpha}{2}\right) \times \cos \alpha$$

$$a = .2165 \quad r = .250$$

$$\Delta X = r \times \sin \alpha = .1056$$

$$X = 4.0 - .2165 + .1056 = \underline{3.8891}$$

$$Y = 6.0 - d + b + \Delta Y$$

$$c = 4 - 2.8 = 1.2$$

$$\tan \alpha = \frac{d}{c} \quad d = c \times \tan \alpha = .5595$$

$$b = R \times \tan\left(45° - \frac{\alpha}{2}\right) \times \sin \alpha = .1009$$

$$\Delta Y = r \times \cos \alpha = .2266$$

$$Y = 6.0 - .5595 + .1009 + .2266 = \underline{5.7680}$$

Figure 2. PRIOR ART

| Position | ΔX | ΔY | X | Y | I | J | |
|---|---|---|---|---|---|---|---|
| ② | | | -0.25 | -0.25 | | | |
| ③ | | | -0.25 | 2.5 | 2.0 | 0 | ← Arc start |
| ④ | (1.75+0.25) × Sin(24.8842°) = 0.8416 | 2 × Cos(24.8842°) = 1.8143 | 0.8416+1.75 = 2.5916 | 2.5 + 1.8143 = 4.3143 | | | ← Arc end |
| | 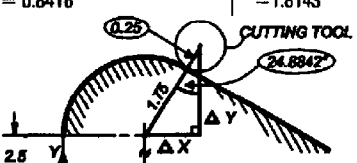 | | | | | | |
| ⑤ | (1.5+0.25) × Sin(24.8842°) = 0.7364 | 1.75 × Cos(24.8842°) = 1.5875 | 4.5 + 0.7364 = 5.2364 | 1.5 + 1.5875 = 3.0875 | -0.7364 | -0.5875 | ← Arc start |
| | 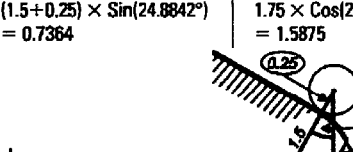 | | | | | | |
| ⑥ | | | 4.5 | -0.25 | | | ← Arc end |
| ⑦ | | | -0.25 | -0.25 | | | |
Figure 3. PRIOR ART

TOOL OFFSET COORDINATE TABLE

Customer ABC Manufacturing  Part No. 14617

Tool Radius .375  Roughing _____

Table Prepared By W E N  Date 8-19-60  Finishing X

| Pt. No. | X | Y | Z | Pt. No. | X | Y | Z |
|---|---|---|---|---|---|---|---|
| 0 | 6.000 | 10.000 | | 18 | 10.300 | 12.763 | |
| 1 | 9.400 | 10.800 | | 19 | 9.868 | 12.390 | |
| 2 | 9.906 | 10.937 | | 20 | 9.828 | 12.016 | |
| 3 | 10.000 | 9.312 | | 21 | 9.868 | 12.150 | |
| 4 | 8.947 | 8.780 | | 22 | 9.968 | 12.016 | |
| 5 | 8.947 | 8.750 | | 23 | 7.093 | 11.969 | |
| 6 | 8.947 | 7.125 | | 24 | 9.896 | 11.328 | |
| 7 | 9.962 | 7.125 | | 25 | 10.657 | 11.154 | |
| 8 | 7.437 | 8.344 | | 26 | 9.907 | 10.938 | |
| 9 | 10.000 | 8.344 | | 27 | 12.341 | 11.500 | |
| 10 | 10.000 | 9.311 | | 28 | 9.855 | 11.250 | |
| 11 | 10.000 | 8.344 | | 29 | 9.108 | 11.188 | |
| 12 | 12.563 | 8.344 | | 30 | 9.804 | 11.467 | |
| 13 | 10.308 | 7.125 | | 31 | 10.500 | 11.750 | |
| 14 | 11.035 | 7.125 | | 32 | 9.868 | 12.154 | |
| 15 | 11.035 | 10.000 | | 33 | 9.154 | 12.780 | |
| 16 | 10.937 | 11.923 | | 34 | 10.093 | 11.562 | |
| 17 | 10.000 | 11.875 | | 35 | 8.791 | 11.122 | |

Figure 4. PRIOR ART

METHODS AND SYSTEMS FOR PRODUCING NUMERICAL CONTROL PROGRAM FILES FOR CONTROLLING MACHINE TOOLS

BACKGROUND OF THE INVENTION

1. Field of the Invention

The present invention relates generally to numerical control of machines and more specifically and particularly to a new and improved method and apparatus for the manual CNC programming of numerical control machines and for such other structures and methods as may be herein disclosed.

2. Background Information

Shortly after the development of computer controlled machining in the late 1940's, it became evident that a computer could control the X, Y, and Z axes of a machine, but calculating the cutter location to be entered into the computer controller to cut the parts was difficult.

Many computer controlled machines are programmed using the NC programming language (EIA-274) which is comprised of straight-forward commands. As used herein EIA-274, G-Code and Word Address Programming are synonymous.

The techniques available for writing NC programs include Manual Programming, Conversational Programming, Graphic Based Computer Assisted Programming (CAM packages), Language Based Computer Assisted Programming (e.g., APT) and Parametric Programming. Of these techniques, Manual Programming is undoubtedly the most common.

The NC programming language is not a difficult language to use. The predominant problem with Manual NC programming is the determination of cutter location information. The cutter location information is the conversion of geometry supplied by the part drawing into the coordinates that the cutter must be moved to. Part drawings supply only the finished geometry. Depending on the job and the material, the programmer may have to include the cutter information for roughing operations.

Math:

The first and most fundamental technique to develop cutter location information is by using right angle trigonometry, algebra, or other mathematical tools. Math is the primary technique taught to students learning to program computer controlled machines. The two greatest drawbacks in the use of mathematics are the time necessary to do the calculations and the possibility for error. As more complex geometry is required to be machined, the calculations take more time with greater possibility of error.

APT:

In the mid-1950's, before graphics were an integral part of computers, the first language-based computer aided programming technique was developed. It is called APT for Automatic Programmed Tools. With this technique, the programmer describes the geometry of the part, the machining operation, the tool motion in a high-end programming language (e.g., FORTRAN). This program is compiled and debugged and compiled and debugged. After all the errors are worked out, the computer will perform all of the trigonometry and other mathematical requirements and generate an ANSI standardized "cutter location data file" also known as a cldata file.

To use this cutter location information on a machine tool, this "cldata" file has to be converted into the specific G-Code requirements of the computer controller. This task is accomplished using a secondary computer program called a "Post-Processor".

The greatest problem with APT is that it is a convoluted, difficult, high-end programming language that most machinists, NC programmers, and manufacturing engineers do not understand.

After graphics were developed for computers, it was inevitable that they would be used to design parts and develop cutter location information. Surprisingly though, these two uses came from two different directions instead of working together.

CAM:

The third primary technique to develop cutter location information is the use of Computer Aided Manufacturing (CAM) software. There are many CAM systems on the market today, each offering its own unique advantages and disadvantages.

First of all, CAM systems are in the category: Graphic Based—Computer Assisted Programming Technique. Typically, these systems will retrieve a part designed in a CAD system, and using knowledge about the machining operation and internal algorithms, will graphically design the toolpaths. As necessary, and depending on the CAM system, the user can edit the toolpaths.

This graphical information is then processed internally by the CAM system to generate the cutter location information. Depending on the CAM system, it will generate either 1) The ANSI standardized cutter location data file, or 2) It may have an internal "post processor" capability that converts the cutter location information into the G-Code requirements of the machine tool without the user ever seeing the cutter location information.

The problems with CAM systems are that they are expensive, cumbersome, and require a level of knowledge and consistency of usage that is beyond that of typical machine tool operators. And, they are individual enough that knowing how to use one does not mean that a user can use them all.

CAD Measure Feature:

Another technique to generate cutter location information is to use the "measure" feature of a CAD system to measure the distance from what is referred to as Program Zero to the location of interest to the program.

This programming technique, like math, is under the category: Manual Programming. Although CAD is used to measure the coordinates that the cutter must be moved to, the programmer must manually transfer the information from the CAD system to paper and convert this information into the requirements of the machine controller. This task takes time with the potential for error.

Conversational Controllers:

Ultimately, the goal of all programming techniques is to write a program that will cut parts to the specifications of the design. Each process discussed thus far requires two steps: 1) generate a cutter location file, then, 2) convert it to the requirements of the machine controller.

Conversational Controllers are another way to generate a program. They employ an on-line (i.e., on the machine controller) programming technique that basically prompts the machine tool operator for information about the part features, such as contours, pockets, bolt hole patterns, etc. These controllers have internal algorithms that convert the supplied part feature information into program commands.

CAD Geometry:

The last technique has to do with using CAD geometry (i.e., lines, circles, and arcs) and converting these objects into G-code directly, in essence bypassing the cutter location step.

Actually, the cutter location information is not bypassed, it (like CAM) is converted to NC program code without the user ever seeing the cutter location information. The cutter location information is simply in a non-standardized format, i.e., it is the geometry of the part (the lines, arcs, and circles) that is converted into NC program code with significant data manipulations within the computer.

The problem with this technique is that, typically, the features that make up the part design are not created in the sequence required in the machining operation. This means if you want a linear move, you retrace the line, and a circular move requires retracing the arc.

NC Programming:

NC Programming is simply a direct translation of sequential machining decisions to the language the machine controller understands.

The persons involved with machining technology understand well how to select tools, spindle speeds, feedrates, and when to use or not use coolant. The fundamental problem with developing NC programs is a matter of determining the cutter location information, i.e., the X, Y, and Z coordinates.

Those skilled in the art of manual CNC programming know that manual CNC programming is tedious, error prone, and math intensive.

Simultaneously, manual CNC programming is so important to the Manufacturing Industry that it is taught to all levels of users of machining technology, i.e., to engineering students in universities to machining students in trade schools.

The primary reason to have manual CNC programming competence is because it is the foundation of computer controlled machining.

In practice, every time a part is to be cut on a computer controlled machine, those responsible for machining the part must determine if the program can be developed manually, or must be done with a CAD/CAM system.

And admittedly, with the standard knowledge of manual CNC programming, and the fact some parts are so simple, the CNC part program can be, should be, and is completed manually.

The text book approach to the steps involved with manual CNC programming are shown in FIG. 1, which is a prior art figure, and are as follows:

1) Plan the machining operation, i.e., select fixtures and tools, determine speeds and feeds.

2) Design the tool paths as required for profiling operations, determine the cutter coordinates and tabulate the cutter coordinates on paper.

3) Write, check and run the G-Code program.

Not all steps are required for all programming/machining jobs. Sometimes the machining task is so simple, for example drilling and counter boring operations, that the program can be keyed directly into the machine controller, bypassing most of the aforementioned steps.

The range of difficulty associated with how to determine the cutter coordinates, as mentioned in Step 2 above is broad. At times, cutter coordinates can be obtained directly from the part drawing. At other times a great deal of algebra and right angle trigonometry is required. A text book example that shows some of the math that may be required to obtain cutter coordinates is shown in FIG. 2, which is a prior art figure.

The text book approach to tabulate the cutter coordinates mentioned in Step 2 above is with the use of a coordinate sheet. A text book example that shows a combination of both the math required and the organizational cutter coordinate sheet is shown in FIG. 3, which is a prior art figure.

FIG. 4 is another prior art, text book example of a typical coordinate sheet. It is to be noted that this form of coordinate sheet was used as early as 1960.

Those skilled in the art know that in addition to the time and difficulty associated with the math requirements to generate cutter coordinates, there are other problems associated with manual CNC programming. The amount of time and errors associated with manually writing and checking the CNC program are well known.

Calculators and text editors on personal computers are two technologies currently available and commonly used to aid with the mathematical calculations of cutter coordinates and to write the CNC program respectively.

Although calculators and text editors are very beneficial, especially when compared to the alternatives, there are voids in the technology that, if made available, could alleviate much of the time and errors that are associated with manual CNC programming.

The missing technologies specifically include the lack of a means to perform a graphical verification of the tool path created by the manually generated cutter coordinates, the lack of a means to modify (copy, move program zero, etc.) the manually generated cutter coordinates, and most significantly a lack of a means to manually generate cutter coordinates with Computer Aided Design (CAD) technologies available that would be much easier, faster and more accurate than through the mathematical approach previously discussed herein.

Clearly, it would well serve the industry, specifically those that teach, learn, and use manual CNC programming to have means to perform these aforementioned tasks.

Among the references which set forth the general state of the art regarding numerical programming are the following:

Smid, Peter, CNC Programming Handbook, A Comprehensive Guide to Practical CNC Programming. 2003. $2^{nd}$ Edition. New York: Industrial Press.

Valentino, James and Goldenberg, Joseph. Introduction to Computer Numerical Control (CNC). 2000. $2^{nd}$ Edition. New Jersey: Prentice Hall.

Lynch, Mike. Computer Numerical Control for Machining. 1992. New York: McGraw Hill.

Polywka, John and Gabrel, Stanley. Programming of Computer Numerically Controlled Machines. 1992 New York: Industrial Press.

Nanfara, Frank, et al. The CNC Workbook, An Introduction to Computer Numerical Control. 1995. Massachusetts: Addison-Wesley.

Green, Robert E. Editor. Machinery's Handbook, $25^{th}$ Edition. 1996. New York: Industrial Press.

Dallas, Daniel B. Editor. Tool and Manufacturing Engineers Handbook, A Reference Work for Manufacturing Engineers. $3^{rd}$ Edition. 1976. New York: McGraw Hill.

Wilson, Frank W., Editor-in-Chief, Numerical Control in Manufacturing prepared by the American Society of Tool and Manufacturing Engineers. 1963. New York: McGraw Hill.

Among the U.S. Pat. Nos. 6,704,611; 6,745,100 and 6,907,313 show relevant computer aided manufacturing. U.S. Pat. Nos. 6,904,394 and 6,795,749 relate to CAD data. U.S. Pat. Nos. 6,957,123; 6,889,114; 5,270,918; and 4,949,270 relate to automatic programming. Other examples of related prior art approaches will be found in the following U.S. patents: U.S. Pat. Nos. 6,907,312; 6,885,984; 6,868,359; 6,804,575; 6,741,905; 6,671,571; 6,643,560; 6,311,100; 6,112,133; 5,963,451; 5,584,016; 5,532,933; 5,297,022; 5,293,321; 4,928,221; 4,912,625; and 4,370,720. These items of prior art are seen as setting forth relevant background information, but none teaches or discloses the combination of steps and components of a system which constitute the present invention as disclosed and claimed.

SUMMARY OF THE INVENTION

In view of the foregoing, it is an object of the present invention to provide a novel, unobvious and beneficial means that fills the technological void that has been a long standing problem of manual CNC programming as discussed above. That is, the summary of the invention is to provide a technology that would be best described as a manual CNC programming system. This system comprises a manual computer numerical control (CNC) programming system in which coordinates may be manually entered into a text editor into a file format known as the coordinate work sheet (CWS) including verification, modification and conversion of the CWS to G-Code and further including cutter on/off commands and using computer aided design (CAD) software to generate cutter coordinates and motion.

Pursuant to the foregoing, it may be regarded as an object of the present invention to overcome the deficiencies of and provide for improvements in the state of the prior art as described above and as may be known to those skilled in the art.

It is a further object of the present invention to provide a process which may be carried out relatively simply.

Still further objects may be recognized and become apparent upon consideration of the following specification, taken as a whole, in conjunction with the appended drawings and claims, wherein by way of illustration and example, an embodiment of the present invention is disclosed.

The above and other objects of the present invention are realized and the limitations of the prior art overcome by providing a new, novel and improved method for generating a coordinate work sheet manually or with the assistance of CAD in a comma delimited ASCII text file and providing: a) for the graphical verification of the coordinate work sheet, b) for the modification of the coordinate work sheet and c) for the conversion of the coordinate work sheet to G-Code format.

It should be understood that the above is not intended to imply that CAD generates or creates the coordinate work sheet, but that the software of the present invention does, using CAD data.

BRIEF DESCRIPTION OF THE DRAWINGS

The above mentioned and other objects and advantages of the present invention as well as a better understanding of the principles and details of the present invention which will be evident from the following description taken in conjunction with the appended drawings.

The drawings constitute a part of this specification and include exemplary embodiments of the present invention, which may be embodied in various forms.

It is to be understood that in some instances various aspects of the invention may be shown in exaggerated, reduced, or enlarged or other wise distorted fashion to facilitate an understanding of the present invention.

Figure 1:
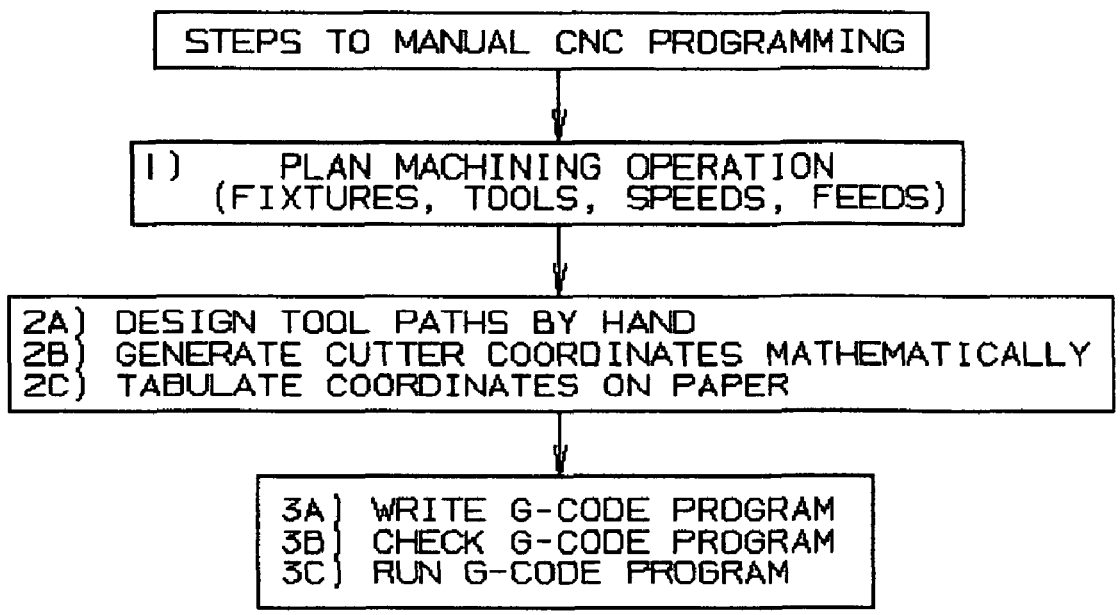

FIG. 1 is a chart that shows the steps of manual CNC programming. This figure is a prior art figure.

FIG. 2 is a text book example of the math requirement to obtain cutter coordinates. This figure is a prior art figure.

FIG. 3 is a text book example of the math requirements to obtain cutter coordinates and to the hardcopy coordinate sheet. This figure is a prior art figure.

FIG. 4 is a text book example of a hardcopy coordinate sheet. This figure is a prior art figure.

Figure 5:
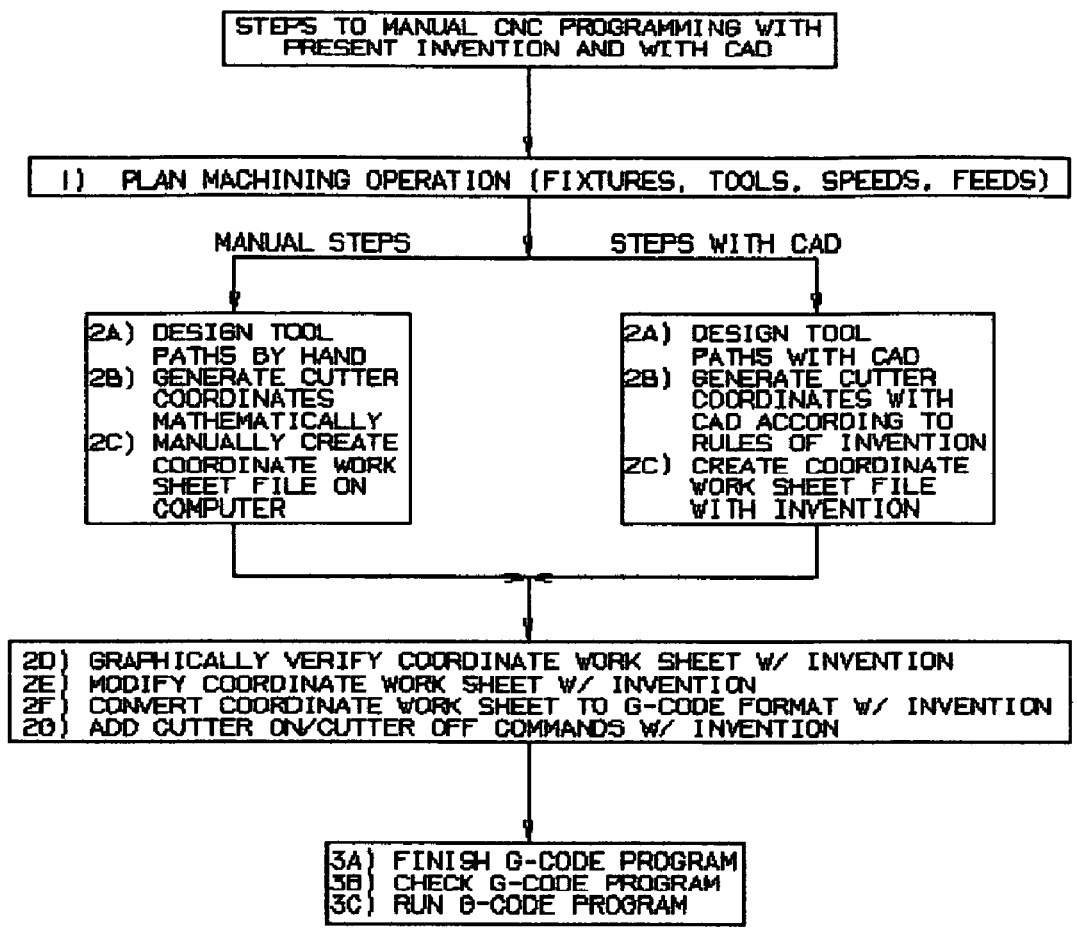

FIG. 5 is a chart showing both the steps of manual CNC programming using the present invention and the steps of manual CNC programming using CAD to design tool paths and to generate cutter coordinates.

Figure 6:
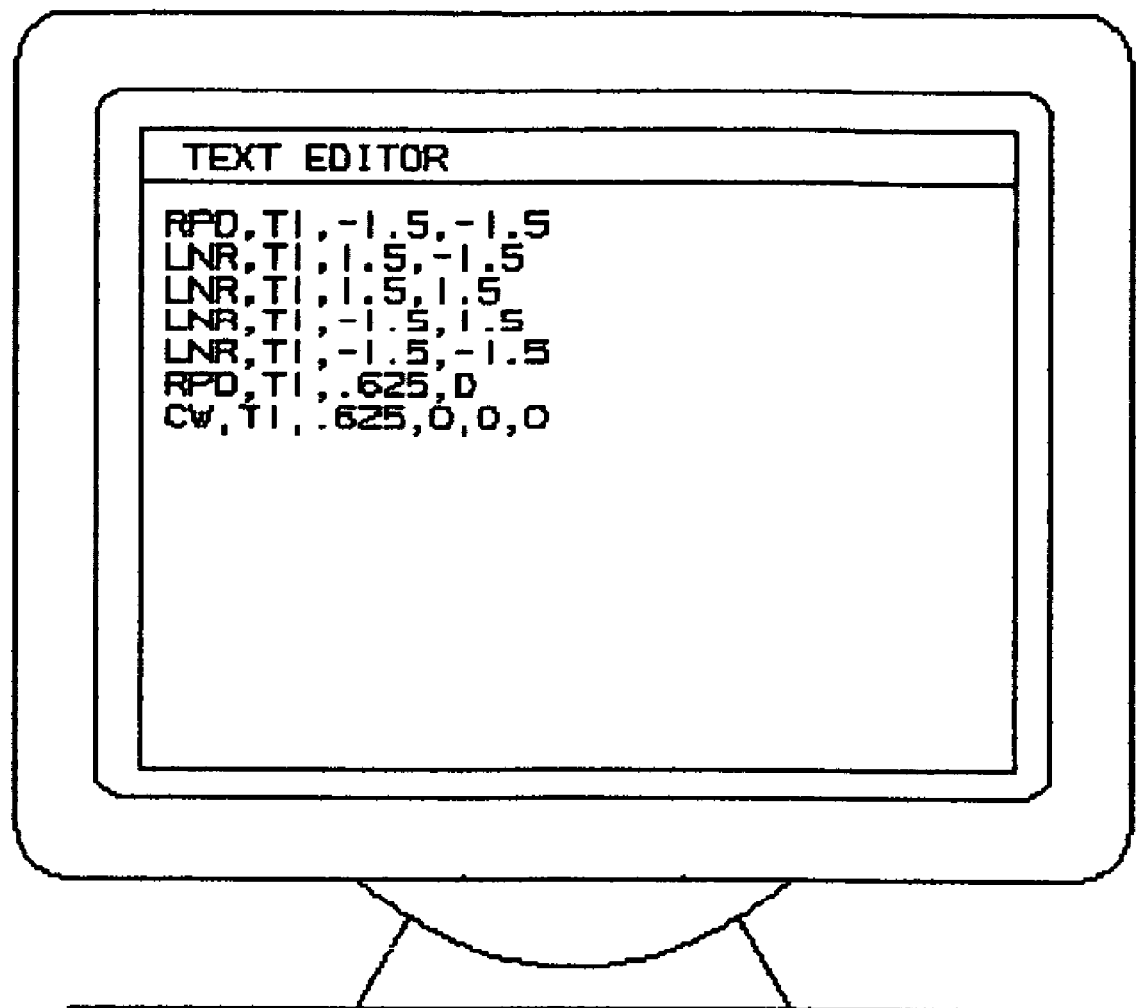

FIG. 6 is an example of the preferred embodiment of a coordinate work sheet being completed on a computer monitor.

Figure 7:
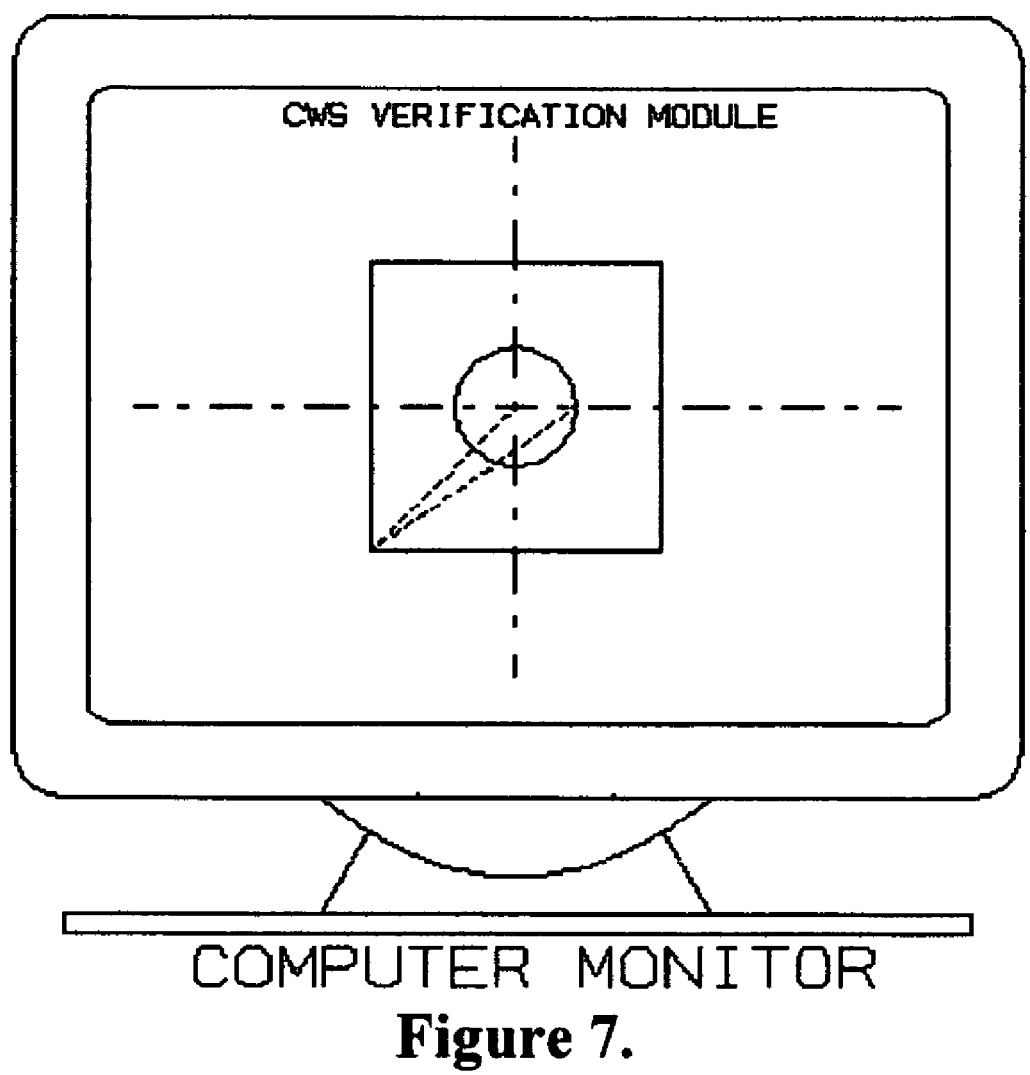

FIG. 7 is an example of the preferred embodiment of a graphical verification of the coordinate work sheet on a computer monitor.

Figure 8:
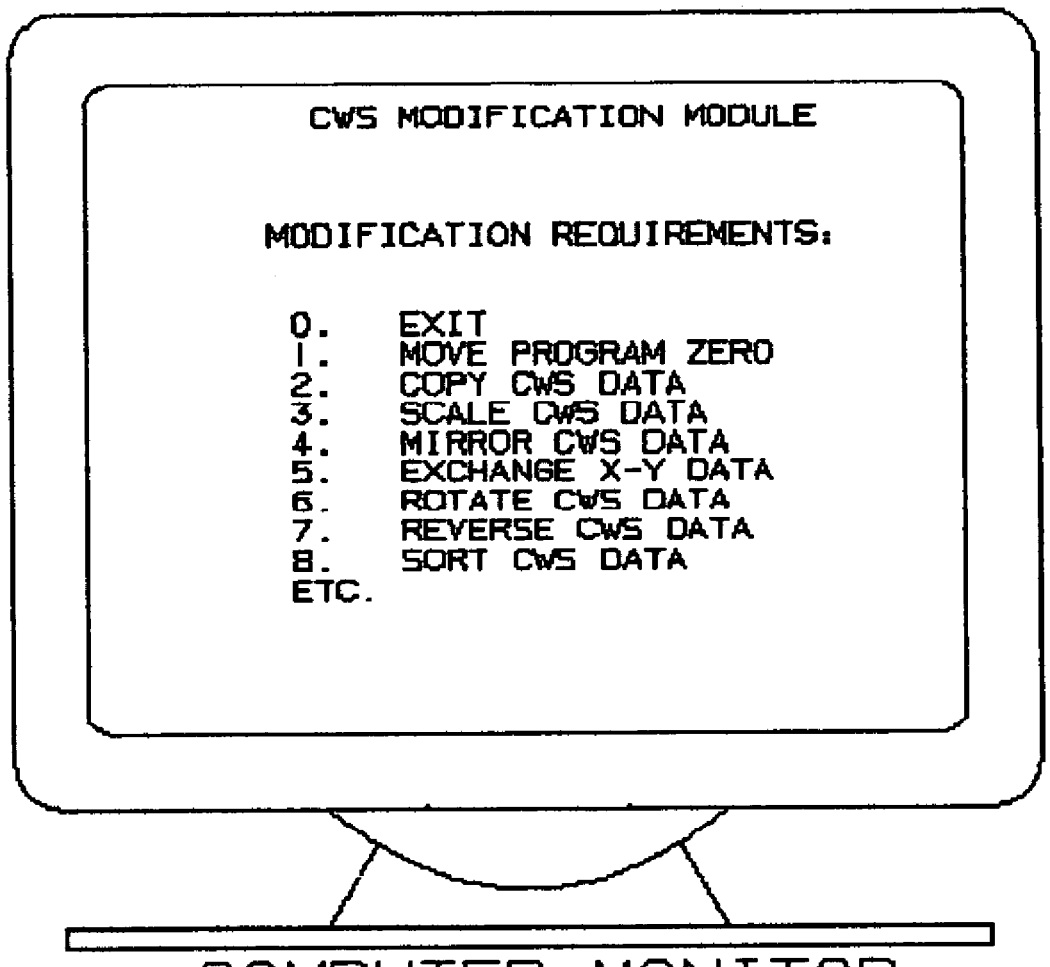

FIG. 8 is an example of the preferred embodiment of the choices available of the modification of the coordinate worksheet on a computer monitor.

Figure 9:
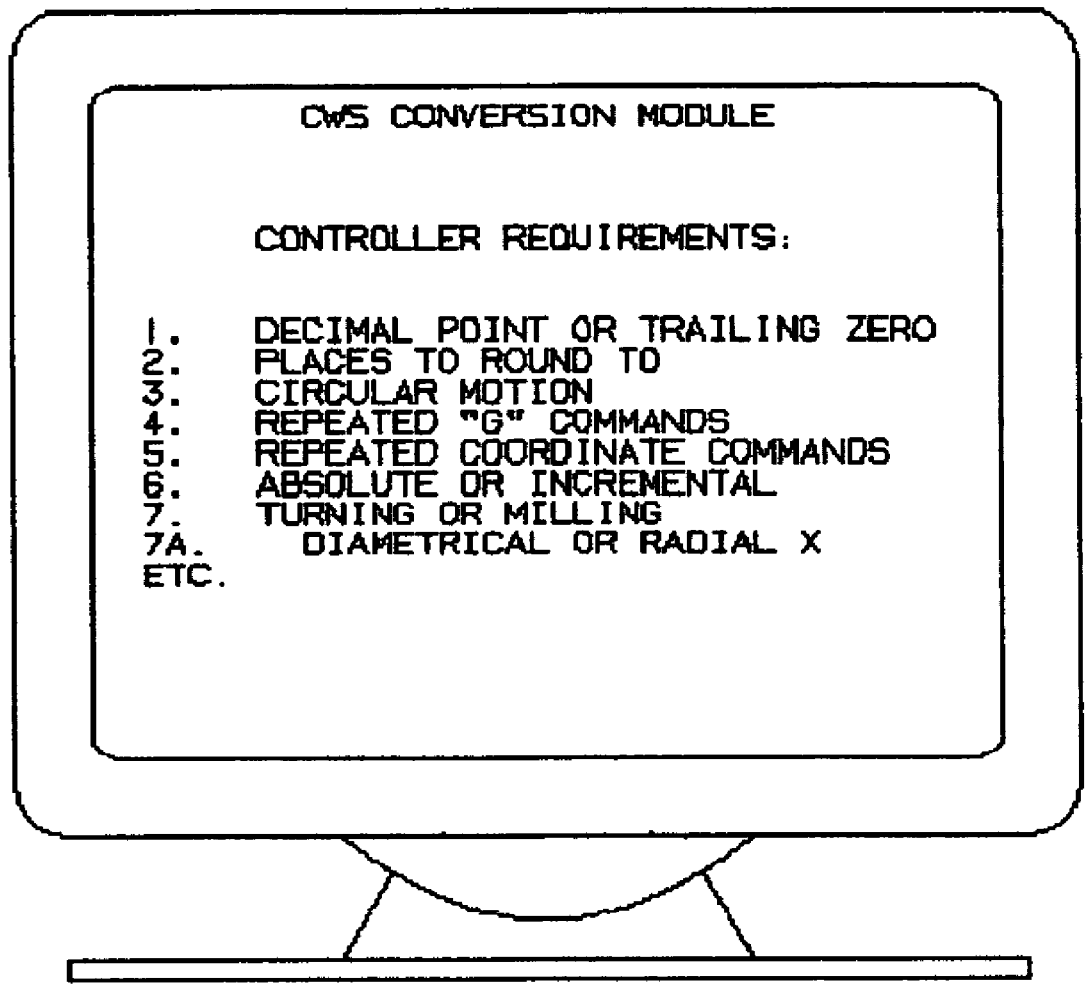

FIG. 9 is an example of the preferred embodiment of the choices available of the conversion of the coordinate worksheet to G-Code format on a computer monitor.

Figure 10:
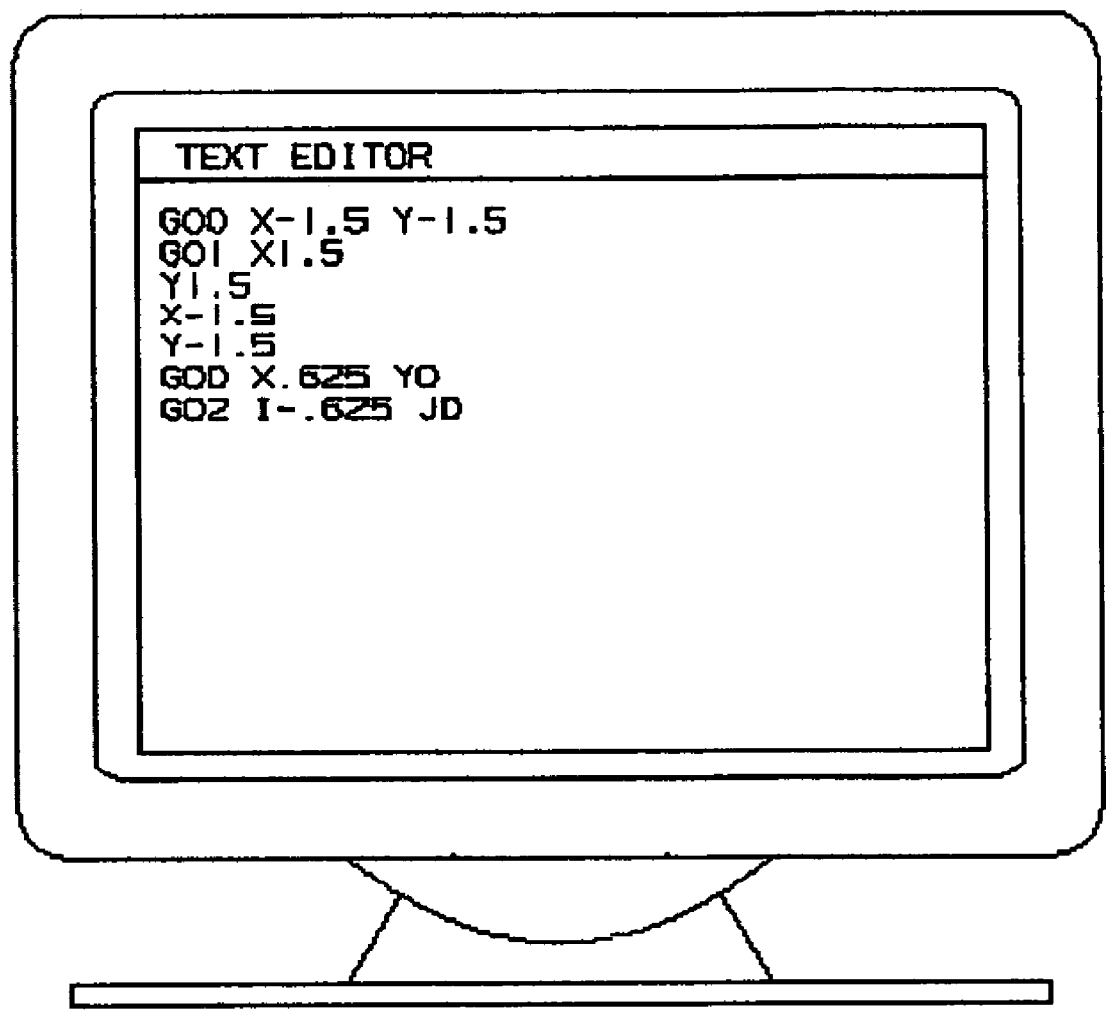

FIG. 10 is an example of the result of the conversion of the coordinate work sheet to G-Code format on a computer monitor.

Figure 11:
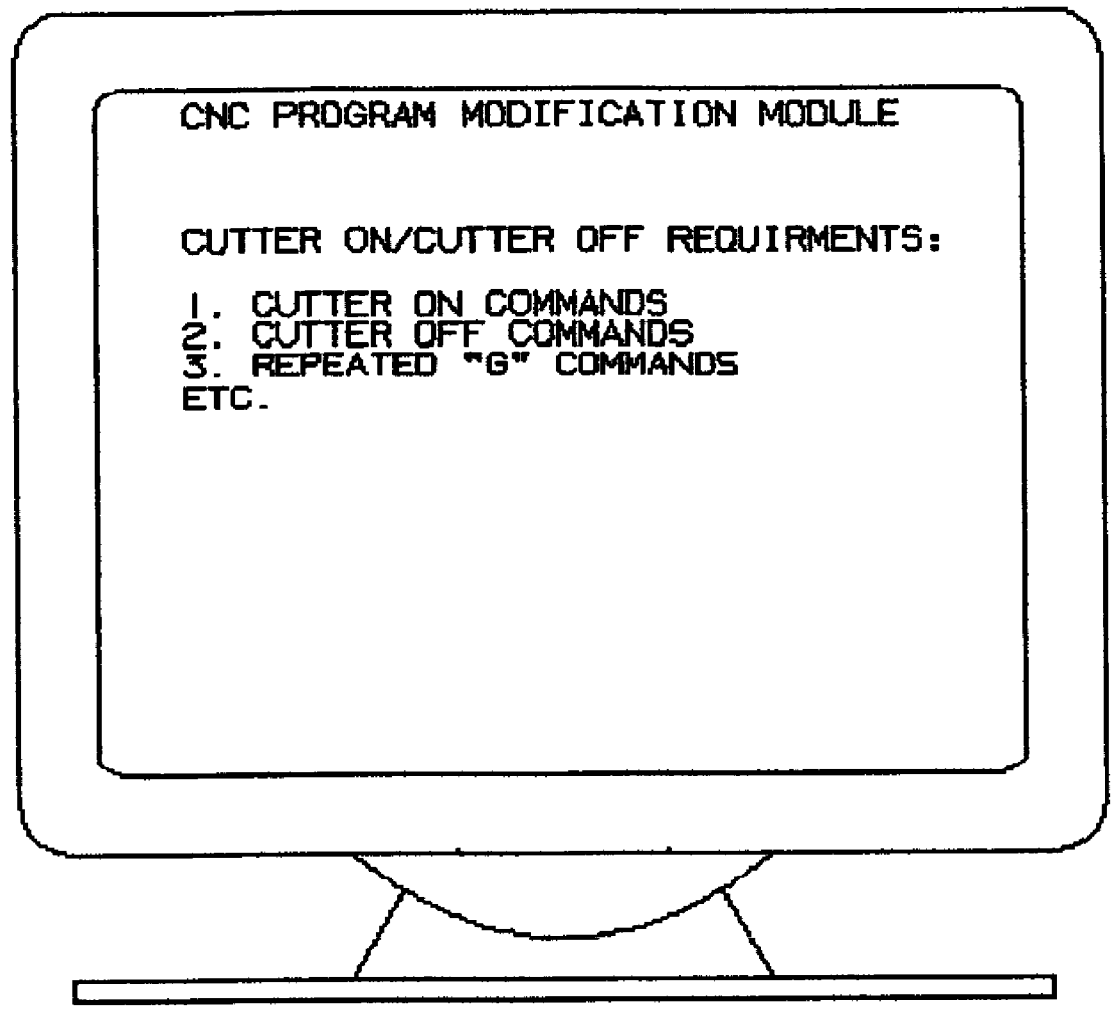

FIG. 11 is an example of the preferred embodiment of the user prompts used for Cutter on/off input on a computer monitor.

Figure 12:
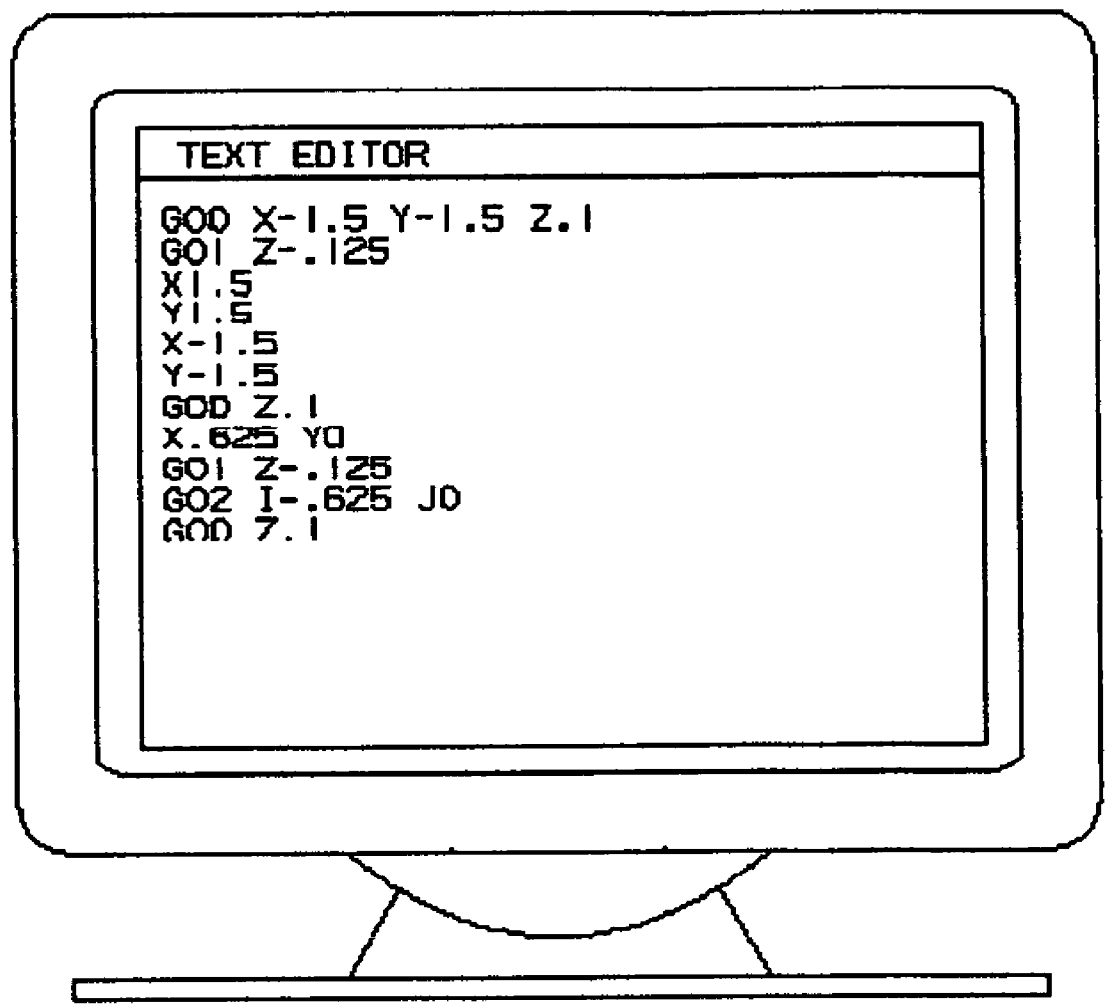

FIG. 12 is an example of the result of adding the cutter on/off commands to the G-Code program on a computer monitor.

Figure 13:
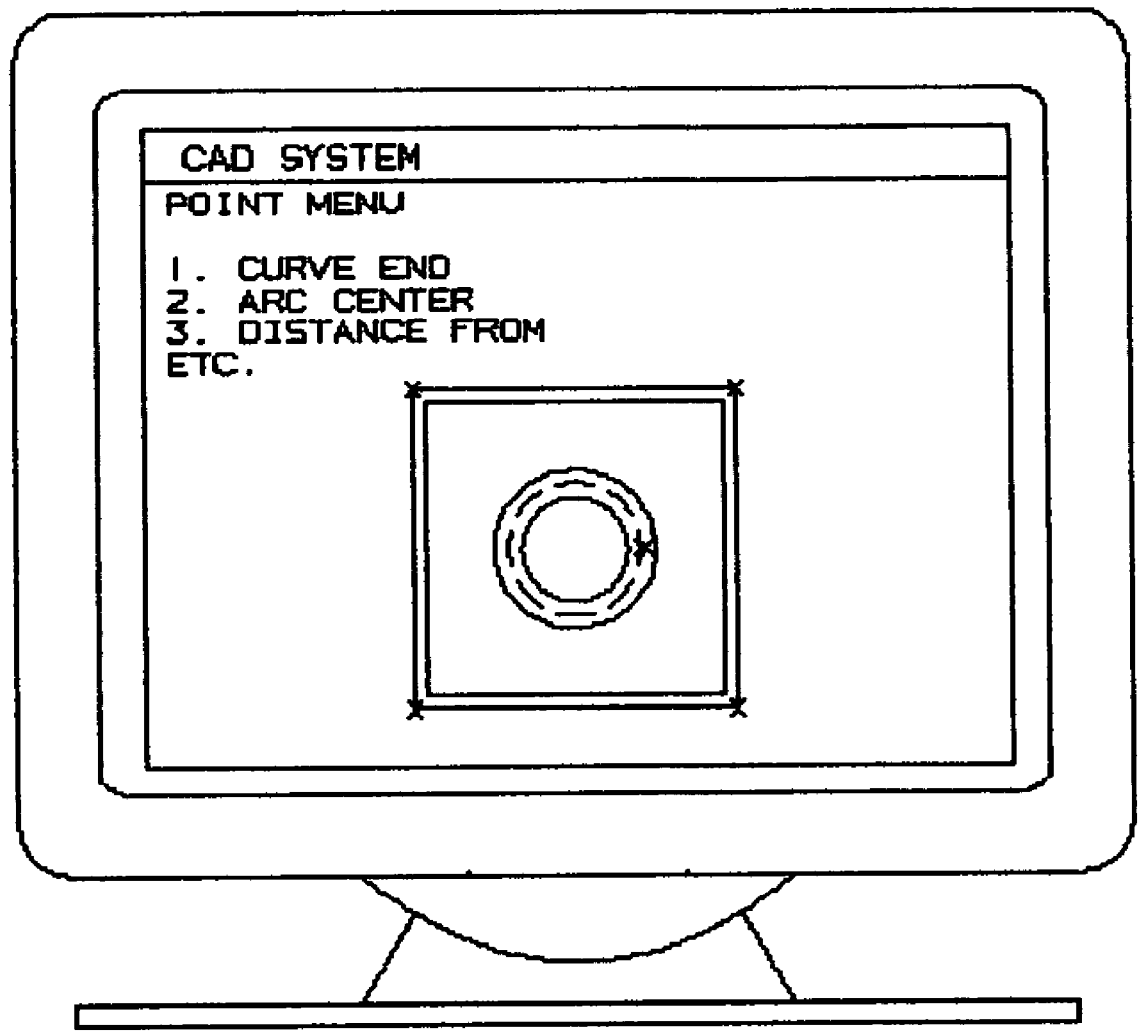

FIG. 13 is an example of using CAD to create the points and lines that correspond to the requirements of the coordinate work sheet.

Some of the elements and concepts of the present invention are shown in the above figures as conceptual illustration only and are not necessarily drawn to scale.

In the accompanying drawings, like elements are given the same or analogous references when convenient or helpful for clarity. The same or analogous reference to these elements will be made in the body of the specification, but other names and terminology may also be employed to further explain the present invention.

DETAILED DESCRIPTION OF THE PREFERRED EMBODIMENTS

For a further understanding of the nature, function, and objects of the present invention, reference should now be made to the following detailed description taken in conjunction with the accompanying drawings. Detailed descriptions of the preferred embodiments are provided herein, as well as, the best mode of carrying out and employing the present invention. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, manner, or environment. The practice of the present invention is illustrated by the following examples which are deemed illustrative of the process taught by the present invention as well as providing the teachings for the products and articles of manufacture yielded in accordance with the present invention.

In view of the foregoing introduction, and as has been noted, an object of the present invention is to provide a novel, unobvious and beneficial means that fills the technological void that has been a long standing problem of manual CNC programming as discussed above. That is, the invention is to provide a technology that would be best described as a manual CNC programming system. This system comprises a manual computer numerical control (CNC) programming system in which coordinates may be manually entered into a text editor into a file format known as the coordinate work sheet (CWS) including verification, modification and conversion of the CWS to G-Code and further including cutter on/off commands and using computer aided design (CAD) software to generate cutter coordinates and motion.

The Coordinate Work Sheet format:

FIG. 5 shows the steps involved in manual CNC programming while using the present invention. The first difference compared to the steps shown in FIG. 1 has to do with the development of the coordinate sheet. Instead of manually creating a table of coordinates on a coordinate sheet, the cutter coordinates are either manually entered with a text editor into a file format known as the coordinate work sheet (*.cws) or a CAD system is used in conjunction with the present invention to create the coordinate work sheet. The use of CAD will be discussed later.

The coordinate work sheet as is used in the present invention is a derivation of the coordinate sheets shown in FIG. 3 and FIG. 4, but with three very important and novel differences:

1) The coordinate work sheet is a comma delimited ASCII text computer file, not a tabulated hardcopy.
2) It includes a column for four types of tool motion: rapid, linear, clockwise, and counterclockwise.
3) It includes another column for miscellaneous programming prompts (tool number, feeds, depths, etc.).

An example of the manually created Coordinate Work Sheet file on a computer monitor is shown in FIG. 6.

The comma delimited ASCII text Coordinate Work Sheet file takes on the specific format as follows:

RPD,T1,##.####,##.####
LNR,T1,##.####,##.####
CW,T1,##.####,##.####,##.####,##.####
CCW,T1,##.####,##.####,##.####,##.#### where "RPD," "LNR," "CW," "CCW," is the acronym for rapid, linear, clockwise, and counterclockwise, respectively.

"T1" is the miscellaneous programming prompt, used as an organizational programming feature created for the CNC programmer to designate different tools, depths, feed rates, part features, or anything else as the programmer may desire or decide.

"##.####,##.####" are the two dimensional X and Y coordinates of the cutter, relative to program zero.

"##.####,##.####,##.####,##.####" are the two dimensional X and Y coordinates for both the endpoint and center point of the circular cutter moves respectively, relative to program zero.

The purpose of this novel CWS format is simple: it can be verified, modified, and converted to G-Code within and as a part of the present invention.

Verification Features of the Preferred Embodiments:
    CWS format error check
    Seamlessly integrated and stand alone
    Scaled to fit screen
    Color changes at prompt changes
    Dotted line indicates rapid motion
    Sequential backplot
    Display of sequence numbers
    Display of cutter coordinates
    User controls speed of verification
    User may clear screen during verification
    User may insert text into CWS file during verification
    User may repeat verification
    User may zoom in verification
    User may zoom out verification
    User may pan verification
    User may cancel verification.

FIG. 7 shows a representation of a graphical verification of a coordinate work sheet using the present invention on a computer monitor.

Modification Features of the Preferred Embodiments:
    User may move program zero
    User may copy coordinates
    User may scale coordinates
    User may mirror coordinates
    User may mirror and copy coordinates
    User may rotate and copy coordinates
    User may reverse coordinate motion
    User may reverse a copy of motion
    User may exchange X-Y coordinates
    User may sort coordinates according to prompt information
    User may VERIFY program for backplot of modifications.

FIG. 8 shows a representation of the modification options of the preferred embodiment.

Conversion of CWS to G-Code:

Features of the Preferred Embodiments:
    Coordinate Format:
        User may select: Decimal, leading and/or trailing zero's without decimal, leading and/or trailing zero's with decimal.
    Motion:
        G00, G01, G02, and G03 used for Rapid, Linear, Clockwise, and Counter-clockwise respectively.
    Axis Words:
        User may select: First and second coordinates from CWS are converted to X and Y (G17 plane), X and Z (Turning and G18 plane), and Y and Z (G19 plane).
    Positioning:
        User may select: Absolute (G90) and Incremental (G91).
    Arc Center Designation:
        User may select: Absolute coordinates, Incremental Distances, Inverse Incremental Distances, and Radius.
    Turning Options:
        User may select: 1) Diametrical or Radial "X" values, 2) X-Z-I-K words or X-Y-I-J words, 3) Front turret or rear turret consideration for clockwise and counter-clockwise motions.
    Additional Formatting Options:
        1) Block numbering, renumbering, un-numbering, 2) Leading "+" symbols added, 3) End of block character added.
    Analysis:
        1) Checks errors in circular motion, 2) Size of NC program, 3) Maximum and minimum X-Y-Z-Feed-Speed values.
    Prompts:
        Changes in the prompt column of the Coordinate Work Sheet create programming prompts in the G-Code file output.

FIG. 9 shows a representation of the conversion options of the preferred embodiment, and FIG. 10 shows a representation of a CNC program as converted.

Cutter On/Off Commands of the Preferred Embodiments:

Those skilled in the art of manual CNC programming understand that turning the cutter on or off in any given programming job are a significant part of the code that goes into the complete CNC program.

The idea of incorporating cutter on/cutter off commands is derived from the effort that once the cutter coordinates are converted to G-Code with the present invention, the effort to write the code to turn the cutter on or off is highly repetitive and could be done faster and more accurately if done automatically.

As it relates to the preferred embodiment of the present invention, the "cutter on" command is located directly after a rapid motion command, and the "cutter off" command is located directly before.

The commands to turn the cutter on or off for plasmajet, waterjet, or laserjet operations might be as simple as an M3 or M5 command respectively or it may be M70 or M73. For a milling or router operation it may be G01 Z-0.125 for cutter on and G00 Z0.5 for cutter off. The user would enter these commands once, upon which the present invention will automatically add them to the G-Code program as described.

FIG. 11 shows a representation of the cutter on/off input of the preferred embodiment, and FIG. 12 shows a representation of a CNC program with commands entered.

Use of Computer Aided Design Software (CAD) to Generate Cutter Coordinates and Motion with the Preferred Embodiment of the Present Invention:

Refer to the coordinate sheet shown in FIG. 3 and note that each tool position is referred to as a point. One definition of a point is a geometric entity that has position, but no extension, i.e., a point is defined by its coordinates.

A line can be defined by two points, i.e., by two sets of coordinates.

Those skilled in the art know that CAD is the preferred engineering design tool and could be used to design tool paths, and to create points and lines.

A novel application of CAD which would be of great benefit compared to the mathematical requirements to create cutter coordinates is to create points and lines in such a way as could be used to support the automatic development of a coordinate work sheet.

As mentioned, FIG. 5 is a chart showing both the steps of manual CNC programming using the present invention and the steps of manual CNC programming using CAD to design tool paths and to generate cutter coordinates.

The preferred embodiment requires CAD use as such:

1) The CAD must export objects in the sequence they are created.

2) The coordinates must be on their own layers, the layer names being used directly in the coordinate work sheet as the programming prompt.

3) The first object must be a point at Program Zero.

4) Two sequential identical points correspond to:
RPD, LAYER,##.####,##.####.

5) One point corresponds to:
LNR,LAYER,##.####,##.####,##.####,##.####

6) One line from arc endpoint to arc center point corresponds to:
CW,LAYER,##.####,##.####,##.####,##.####.

7) Two identical sequential lines from arc endpoint to arc center point corresponds to:
CCW,LAYER,##.####,##.####,##.####,##.####

8) For arcs less than 180 degrees, a point at arc end, followed by a point at arc center corresponds to either:
CCW,LAYER,##.####,##.####,##.####,##.####. or
CW,LAYER,##.####,##.####,##.####,##.####
the direction chosen being dependent on which arc is less than 180 degrees.

9) The CAD file is exported in DXF format.

10) The present invention will extract the coordinates, motion, and layer data from the DXF formatted file and create a coordinate work sheet file automatically.

FIG. 13 shows a generic representation of the use of CAD to create points and lines that correspond to the coordinate work sheet.

As shown in FIG. 5 the steps involved in the manual CNC programming in conjunction with CAD and the present invention include the initial planning of machining operations including selecting fixtures, and determining speeds and feeds. One may then proceed to design tool paths with CAD and to generate cutter coordinates with CAD according to the rules of the present invention. Thereafter, using the teachings and elements of the present invention, a coordinate work sheet file is created on the computer; it is then graphically verified, modified as desired and converted to G-Code format. Cutter "on/off" commands are then added and the G-Code program finished, checked, and run.

In short, the present invention aims are realized by providing a method for generating a coordinate work sheet manually or with the assistance of CAD in a comma delimited ASCII text file and providing: a) for the graphical verification of the coordinate work sheet, b) for the modification of the coordinate work sheet and c) for the conversion of the coordinate work sheet to G-Code.

It is to be noted that the present invention is not a CAM system. It does not require extensive training provided that the manufacturing personnel understand computer controlled machining operations and understand something of the G-Code programming language.

Additionally, the present invention does not require CAD, nor is it dependent on any specific CAD system.

It should be understood that nothing in the above is intended to imply that CAD generates or creates the coordinate work sheet, but that the software of the present invention does, using CAD data.

As has been set forth above the objective of the present invention is to develop a simple, powerful, and accurate manual CNC programming tool for the people who need it: machinists, NC programmers, manufacturing engineers, mechanical designers, drafting technicians, machine shop owners and supervisors and anybody else who has ever had to labor over writing an NC program.

In summary, the present invention relates to a computer based programming method for producing a section of a numerical control program used to control a machine tool upon either the manual or automatic creation of an appropriately formatted coordinate work sheet file, which in addition to producing said section of the numerical control program, may also be used to graphically verify, and modify said coordinate worksheet file.

In this process, an effective representation of a part to be machined may be drawn within a CAD system and an effective representation of the tool paths may also be drawn within a CAD system, and, by using the CAD to create points and lines in unique layers and in the sequence required can be used to develop the coordinate work sheet automatically.

Additionally, by manual calculations, and by reference to the part drawing, the coordinate work sheet may be developed manually.

The appropriately formatted coordinate work sheet file is a comma delimited ASCII text file that will include lines of coordinate data that takes on the general appearance as follows:

RPD,T1,##.####,##.####
LNR,T1,##.####,##.####
CW,T1,##.####,##.####,##.####,##.####
CCW,T1,##.####,##.####,##.####,##.#### where "RPD", "LNR", "CW", and "CCW" correspond to Rapid, Linear, Clockwise, and Counterclockwise motion commands respectively, "T1" is a generic programming prompt in the second column, and "##.####" corresponds to the absolute cutter coordinates of a machining operation relative to program zero.

The present invention allows the user to move program zero, copy, scale, mirror, exchange x-y coordinates, rotate, reverse and sort by programming prompt, the coordinate work sheet.

Modifications of the manually or automatically generated coordinate work sheet may be selected from among the following: a) Move program zero, b) Copy, c) Scale, e) Mirror, e) Mirror with copy, f) Rotate with copy, g) Reverse coordinate motion, h) Reverse copy of motion, i) Exchange X-Y coordinates, j) Sort coordinates according to prompt information, k) Invoke VERIFY program for backplot of modifications.

The present invention allows for the graphical verification of the modified coordinate work sheet and an automatic error check of the format of the coordinate work sheet to be performed prior to the graphical verification thereof. The user is allowed to insert text, zoom in, zoom out, and to pan the graphical verification of the coordinate work sheet during the verification thereof.

The present invention allows for the conversion of the manually or automatically generated coordinate work sheet file to the G-Code format requirements of the machine tool controllers, in which the comma delimited coordinate work sheet data is generally converted to G-Code format as follows:

RPD,T1,##.####,##.#### is converted to:
G00X##.####Y##.####
LNR,T1,##.####,##.#### is converted to:
G01X##.####Y##.##
CW,T1,##.####, ##.####,##.####,##.#### is converted to:
G02 X##.####Y##.#### I##.#### J##.####
CCW,T1, ##.####,##.####,##.####,##.#### is converted to:
G03 X##.#### Y##.####, I##.####, J##.####
Where "X","Y", "I", and "J" are the user prompted coordinate axes and the user may choose "X", "Z", "I", and "K" for turning operations instead.

The present invention allows for the automatic addition of cutter on and cutter off commands in the G-Code program data file by allowing for the user prompted "cutter off" commands to be added to the numerical control program immediately before the "G00", rapid motion, command line and the user prompted "cutter on" commands to be entered to the numerical control program immediately after the "G00", rapid motion, command line.

The CAD data can be used in conjunction with the present invention to create a coordinate work sheet wherein certain rules are required to use CAD, some of which include:
a) Two points in the CAD corresponds to:
RPD,LAYER,##.####,##.####
b) One point in the CAD corresponds to:
LNR,LAYER,##.####,##.####
c) One line in the CAD corresponds to:
CW,LAYER,##.####,##.####,##.####,##.####
d) Two lines in the CAD corresponds to
CCW,LAYER,##.####,##.####,##.####,##.####
e) For arcs less than 180 degrees, a point at arc end, followed by a point at arc center corresponds to either:
CW,LAYER,##.####,##.####,##.####,##.#### or
CCW,LAYER,##.####,##.####,##.####,##.####, the motion of which is dependent on which arc is less than 180 degrees.

Other requirements of using CAD include: a) the point and line information in the CAD that corresponds to the coordinate work sheet must be on unique layers, the layer names being used directly in the coordinate work sheet as the programming prompt, b) the first object made in the CAD must be a point at program zero, and c) the CAD must export the coordinate work sheet data to DXF format in the sequence they were created.

The present invention may also be seen as employing an article of manufacture for generating commands for controlling a computer numerical control machine to fabricate an object from a workpiece, the article of manufacture comprising a computer readable medium holding computer executable instructions for performing a method for producing an object involving a computer based programming method for producing a section, including the cutter coordinate, cutter motion, and cutter on/off sections, of a numerical control program to control a machine tool controller upon the manual or automatic creation of an appropriately formatted coordinate work sheet file; producing said section of the numerical control program and graphically verifying, and modifying said coordinate worksheet file to be converted to G-Code format to be used to produce a numerical control program, where the appropriately formatted coordinate work sheet file is a comma delimited ASCII text file that will include lines of coordinate data that takes on the general appearance as follows:

RPD,T1,##.####,##.####
LNR,T1, ##.####,##.####
CW,T1, ##.####,##.####,##.####,##.####
CCW,T1, ##.####,##.####,##.####,##.####
where "RPD", "LNR", "CW", and "CCW" correspond to Rapid, Linear, Clockwise, and Counterclockwise motion commands respectively, "T1" is a generic programming prompt in the second column, and "##.####" corresponds to the absolute cutter coordinates of a machining operation relative to a "program zero". CAD data can be used, in conjunction with the present invention, to create a coordinate work sheet wherein certain rules are required to use the CAD data, some of which include:
a) two points in the CAD correspond to:
RPD,LAYER,##.####,##.####
b) one point in the CAD corresponds to:
LNR,LAYER,##.####,##.####
c) one line in the CAD corresponds to:
CW,LAYER,##.####,##.####,##.####,##.####
d) two lines in the CAD correspond to:
CCW,LAYER,##.####,##.####,##.####,##.####
e) for arcs less than 180 degrees, a point at arc end, followed by a point at arc center corresponds to either:
CW,LAYER,##.####,##.####,##.######.#### or
CCW,LAYER,##.####,##.####,##.####.##.####, the motion of which is dependent on which arc is less than 180 degrees,
f) the points and line information in the CAD that corresponds to the coordinate work sheet must be on unique layers, the layer names being used directly in the coordinate work sheet as the programming prompt
g) the first object made in the CAD must be a point at program zero, and
h) the CAD must export the coordinate work sheet data to DXF format in the sequence in which they were created.

In the alternative, the present invention may be described as an apparatus for generating commands for controlling a computer numerical control machine to fabricate an object from a workpiece where the apparatus comprises means for executing the following method for producing the object including a computer based programming method for producing a section of a numerical control program used to control a machine tool upon either the manual or automatic creation of an appropriately formatted coordinate work sheet file, which in addition to producing said section of the numerical control program, may also be used to graphically verify, and modify said coordinate worksheet file; producing an effective representation of a part to be machined may be drawn within a CAD system and an effective representation of the tool paths may also be drawn within a CAD system, and, by using the CAD to create points and lines in unique layers and in the sequence required can be used to develop the coordinate work sheet automatically, where the appropriately formatted coordinate work sheet file is a comma delimited ASCII text file that will include lines of coordinate data that takes on the general appearance as follows:

RPD,T1,##.####,##.####
LNR,T1,##.####,##.####
CW,T1,##.####,##.####,##.####,##.#### where "RPD", "LNR", "CW", and "CCW" correspond to Rapid, Linear, Clockwise, and Counterclockwise motion commands respectively, "T1" is a generic programming prompt in the second column, and "##.####" corresponds to the absolute cutter coordinates of a machining operation relative to program zero, and converting the manually or automatically generated coordinate work sheet file to the G-Code format requirements of the machine tool controllers.

The CAD data can be used in conjunction with the present invention to create a coordinate work sheet wherein certain rules are required to use CAD, some of which include:

a) Two points in the CAD corresponds to:
RPD,LAYER,##.####,##.####
b) One point in the CAD corresponds to:
LNR,LAYER,##.####,##.####
c) One line in the CAD corresponds to:
CW,LAYER, ##.####,##.####,##.####,##.####
d) Two lines in the CAD corresponds to
CCW,LAYER, ##.####,##.####,##.####,##.####
e) For arcs less than 180 degrees, a point at arc end, followed by a point at arc center corresponds to either:
CW,LAYER,##.####,##.####,##.####,##.#### or
CCW,LAYER, ##.####,##.####,##.####,##.####, the motion of which is dependent on which arc is less than 180 degrees, f) The points and line information in the CAD that corresponds to the coordinate work sheet must be on their own unique layers, the layer names being used directly in the coordinate work sheet as the programming prompt, and g) The first object made in the CAD must be a point at program zero.

The CAD data in conjunction with the present invention can be used to create a coordinate work sheet wherein the CAD must export the coordinate work sheet data to DXF format in the sequence in which they were created and means to extract the coordinate, motion, and layer data from the DXF formatted file are provided to create a coordinate work sheet file.

The computer program for executing the present invention can be written in any suitable programming language, including, but not limited to, C, C++, and Java. The computer program can be developed using standard programming practices to carry out the steps and techniques described herein.

Preferably, the computer program of the present invention executes on a standalone programmable computer platform having an open type of architecture of a kind commonly called a personal computer, which interfaces to a CNC machine controller using one of any of the well known interface standards. Preferably, the personal computer employs a Pentium III microprocessor chip manufactured by Intel Corporation or the equivalent or better. Preferably, the personal computer also includes a random access memory, a nonvolatile memory such as a hard disk, a keyboard, a mouse and a video display. Preferably, the computer program operates under the Windows operating system manufactured by Microsoft Corporation. However, the computer program is not limited to the aforementioned hardware and software environment. It will be clear to those skilled in the art, the other types of computers and operating systems, such as those manufactured by Apple, Inc., could be used within the spirit and scope of the present invention. Alternatively, the computer program may be integrated with a controller of the CNC machine or within other hardware.

The present invention may be implemented with any combination of hardware and software, including but not limited to the use of keyboards, a mouse, punch cards, tapes, floppy disks, zip drives, hard drives, CD-ROM's, softwired configurations, programmable logic devices, hardwired embodiments and computer-implemented apparatus. If implemented as a computer-implemented apparatus or other apparatus, the present invention is implemented using well known means for performing all of the steps and functions as described herein.

The present invention can be included in an article of manufacture such as but not limited to one or more computer program products having or employing, for instance, computer useable media. The media has embodied therein, for instance, computer readable program code means for providing and facilitating the mechanisms and functions of the present invention. The article of manufacture can be included as part of a computer system, as part of other, separate apparatus or may be sold separately.

It should be understood that nothing in the above is intended to imply that CAD generates or creates the coordinate work sheet, but that the software of the present invention does, using CAD data.

While throughout the present description, we have referred to the invention in certain ways, it will be clear to one skilled in the art that other ways, steps, means, or components may be employed to provide the advantages of the present invention.

It is noted that the embodiment described herein in detail for exemplary purposes is, of course, subject to many different variations in structure, design, form application and methodology. Because many varying and different embodiments may be made within the scope of the inventive concepts herein taught, and because many modifications may be made in the embodiments herein detailed in accordance with the descriptive requirements of the law, it is to be understood that the details herein set forth and provided are to be interpreted as illustrative and not in a limiting sense. It will be understood in view of the instant disclosure, that numerous variations of the invention are now enabled to those skilled in the art. Many of the variations reside within the scope of the present teachings. It is not intended to limit the scope of the invention to the particular forms set forth, but on the contrary it is intended to cover such alternatives, modifications, and equivalents as may be included within the spirit and scope of the teachings of the present invention. Accordingly, the invention is to be broadly construed and is to be limited only by the spirit and scope of the claims appended hereto.

The invention claimed is:

1. A computer-readable medium readable by a computer, said computer-readable medium embodying a program of instructions executable by the computer to cause the computer to produce a numerical control program file for controlling a machine tool by performing the actions of:
- receiving data relating to a tool path, wherein said receiving data relating to a tool path comprises receiving a CAD data file, the CAD data file comprising data relating to a plurality of points and lines comprising the tool path;
- creating a coordinate worksheet file based on the data relating to the tool path, wherein said creating a coordinate worksheet file comprises:
  - creating a linear tool motion command in the coordinate worksheet file for a single point representation in the CAD data file;
  - creating a rapid tool motion command in the coordinate worksheet file for a two-point representation in the CAD data file;
  - creating a clockwise tool motion command in the coordinate worksheet file for a single line representation in the CAD data file; and
  - creating a counter-clockwise tool motion command in the coordinate worksheet file for a two-line representation in the CAD data file;
- presenting the coordinate worksheet file in a user-discernable form;
- receiving a user verification of the coordinate worksheet file; and
- converting the coordinate worksheet file into a series of numerical control commands to produce the numerical control program file.

2. A computer-assisted method for generating a numerical control program file for controlling a machine tool, comprising:
- designing a tool path;
- inputting the tool path into the computer, said inputting comprising inputting a CAD data file, the CAD data file comprising data relating to a plurality of points and lines comprising the tool path;
- instructing the computer to generate a coordinate worksheet based on the tool path by:
  - creating a linear tool motion command in the coordinate worksheet file for a single point representation in the CAD data file;
  - creating a rapid tool motion command in the coordinate worksheet file for a two-point representation in the CAD data file;
  - creating a clockwise tool motion command in the coordinate worksheet file for a single line representation in the CAD data file; and
  - creating a counter-clockwise tool motion command in the coordinate worksheet file for a two-line representation in the CAD data file;
- verifying the coordinate worksheet; and
- instructing the computer to convert the coordinate worksheet into a series of numerical control commands to produce the numerical control program file.

3. The method of claim 2, further comprising editing, on the computer, the numerical control commands to include at least one cutter on/off command.

4. The method of claim 2, wherein verifying the coordinate worksheet comprises verifying a graphical representation of the coordinate worksheet.

5. The method of claim 2, further comprising modifying the coordinate worksheet before instructing the computer to convert the coordinate worksheet into a series of numerical control commands.

6. The method of claim 2, wherein inputting the tool path comprises inputting cutter coordinates into the computer.

* * * * *

UNITED STATES PATENT AND TRADEMARK OFFICE
CERTIFICATE OF CORRECTION

PATENT NO.        : 7,761,183 B2                                              Page 1 of 1
APPLICATION NO.   : 11/352649
DATED             : July 20, 2010
INVENTOR(S)       : Douglas G. Sullivan It is certified that error appears in the above-identified patent and that said Letters Patent is hereby corrected as shown below:

Column 13, Line 22: Insert omitted text -- CCW, T1, ##.####, ##.####, ##.####, ##.#### --

Signed and Sealed this

Twenty-third Day of November, 2010

David J. Kappos
*Director of the United States Patent and Trademark Office*